3,040,413
GLASS FIBER YARNS AND COMPOSITIONS FOR USE IN THE MANUFACTURE OF SAME

Alfred Marzocchi, Manville, and Harold L. Haynes, Lonsdale, R.I., assignors to Owens-Corning Fiberglas Corporation, a corporation of Delaware
No Drawing. Filed Apr. 9, 1957, Ser. No. 651,574
5 Claims. (Cl. 28—75)

This invention is addressed to a forming size applied to glass fibers and while it has particular application to the sizing of staple glass fibers for use in the manufacture of rovings, yarns and fabrics formed thereof, it also finds application for the improvement of the processing and performance characteristics of continuous glass fibers in the manufacture of strands, yarns and fabrics formed thereof.

It is an object of this invention to produce glass fibers sized in forming to improve their processing and performance characteristics in the manufacture of slivers, rovings, yarns and fabrics of staple glass fibers and strands, yarns and fabrics of continuous glass fibers and to improve the bonding characteristics of these strands, yarns, rovings and textiles of sized glass fibers with resinous material such as the unsaturated polyester resins or epoxy resins in the manufacture of glass fiber reinforced plastics, laminates and coated fabrics.

More particularly, it is an object of this invention to produce a glass fiber system treated with a composition capable of the function to improve the receptivity or bonding relationship between the glass fiber surfaces, yarns or fabrics formed thereof and resinous materials applied to the glass fibers in the manufacture of glass fiber reinforced plastics, laminates and coated fabrics and which is capable of functioning simultaneously as a size to enhance the processing characteristics of the glass fibers, and for the protection of the glass fibers against destruction by mutual abrasion while permitting relative movements between the fibers gathered together into a sliver for drafting into rovings and yarns while concurrently bonding the glass fibers in the sliver to give the glass sliver improved strand integrity and better roving properties.

To the present, compositions applied as a size to protect glass fibers and to provide a desired balance between lubricity and bonding for processing the glass fibers through the stages of sliver, roving or yarn formation have been incapable of the desired modification to make the hydrophilic surfaces of the smooth and non-porous glass fibers receptive to resinous materials for enhancing the bonding relationship between the glass fiber surfaces and resinous materials combined therewith in the manufacture of glass fiber-resin systems, as represented by glass fiber reinforced plastics, laminates and coated fabrics. In the event that such glass fiber-resin systems are desired, it has been the practice to treat the yarns and fabrics of glass fibers for the removal of the size previously applied to the glass fiber surfaces followed by replacement of the size with an anchoring agent that is capable of providing a desired preferential bond with the glass and which is receptive to the applied resinous material to tie in the resin with the glass fibers in a manner to improve the performance characteristics thereof.

A single composition capable of the combined function of a size and of an anchoring agent has been the subject of considerable research. While systems have been developed for use with continuous glass fibers in the manufacture of strands and fabrics, the development of a suitable system for staple glass fibers becomes more complicated by reason of the necessity to provide for greater strand integrity to hold the glass fibers together in the sliver during drafting of the sliver into rovings and yarns and to balance the property of better bonding with the need to permit greater relative movements between the fibers during drafting of the sliver into a roving. Coupled with the properties of lubricity and bonding, as described, it has been found desirable also to incorporate a drag in the system in order to minimize non-uniformities in relative movements between the fibers so that a roving of the desired uniformity of fiber density in cross section will be secured.

Thus it is a further object of this invention to produce a forming size capable of combination with staple or continuous fibers concurrently to function both as a size and as an anchoring agent to enhance the processing characteristics of the fibers in strand, yarn, fabric and textile formation and to enhance the compatibility of the sized fibers with the polyester and the like resinous materials or otherwise improve the bonding relation between the sized glass fibers and the resinous materials in the manufacture of coated fabrics and reinforced plastics and laminates. It is a related object of this invention to produce a size composition of the type described which has application as a forming size for both staple and continuous fibers in strand or yarn formation thereby to eliminate the necessity for separate systems for staple as compared to continuous glass fibers, which combines good wet strength with good dry strength under various conditions of use, which has compatibility with unsaturated polyester and epoxy resins employed in combination with glass fibers in the manufacture of reinforced plastics and coated fabrics, which is capable of the combined functions of a size and anchoring agent thereby to eliminate the necessity for plural steps to remove the size originally applied in forming to enable application of an anchoring agent to the glass fiber surfaces after the fibers had been processed to the condition desired for use as a reinforcement or coated fabric.

It has been found that the described combination of characteristics can be secured by a specific treating composition in the form of an aqueous system containing in combination a polyvinyl acetate, a dextrinized starch, and an unsaturated organo-silicon compound as essential components, with possible modification to include a cationic amine softener or glass fiber lubricant, a polyhydric alcohol polymer, and/or a glycerol triacetate.

The polyvinyl acetate film forming resinous material, as represented by the material manufactured and sold by Swift & Company under the trade name "1482-2," by Quaker Oil Company under the trade name "R-HS," or by the Colten Chemical Company under the trade names "Vinac OC-28" or "Vinac XX," may be employed in the system in a concentration of 4–12 percent by weight of solids in the composition and preferably in an amount within the range of 4–8 percent by weight.

The dextrinized starch, which is a hydrophilic colloid soluble in water, may be employed in the system in a concentration within the range of 0.5–2.0 percent bye weight and preferably in an amount within the range of 0.5–1.0 percent by weight.

As the unsaturated organo-silicon compound, it is desirable to make use of a silane, its corresponding silanol or polysiloxane in which the silane is formed with at least two and preferably three hydrolyzable groups, as represented by chloro, bromo, methoxy, ethoxy or other readily hydrolyzable groups, and wherein at least one of the organic groups attached directly to the silicon atom is an acyl group containing less then 8 carbon atoms in any aliphatic arrangement and which is formed with an unsaturated carbon to carbon linkage, as represented by an ethylenic group capable of addition polymerization. It is preferred to make use of an organo-silicon compound such as vinyl tris beta methoxy ethoxy silane or vinyl trichloro silane, or other corresponding material wherein the organo-silicon compound is present in an amount within the range of 0.4–2.0 percent by weight and preferably within the range of 0.5–1.0 percent by weight.

When a polyhydric alcohol polymer is employed in the treating composition, an amount within the range of 0.5–2.0 percent by weight solids can be incorporated. Suitable polyhydric alcohol polymers may be selected of the polyethylene glycols, polypropylene glycols, polypyrollidones and the like and mixtures thereof wherein the polymer has an average molecular weight within the range of 1,000 to 20,000, as represented by the "Carbowax" materials marketed by the Carbide and Carbon Chemicals Co.

As the cationic softener or glass fiber lubricant, use can be made of fatty acid amines or amide compounds, as represented by pelargonate amide solubilized with acetic acid (Arnold-Hoffman Company "RL–185A"), tetraethylene pentamine reacted to contain five allylmethallyl side chains as a direct substitution on the nitrogen groups (Arnold-Hoffman Company "RL–220"), tetraethylene pentamine stearic acid condensate solubilized with acetic acid (Cationic X), and the like fatty acid amides and amines such as the diamine formed of cocoanut oil fatty acids and the like. When employed, such glass fiber cationic softeners and lubricants can be employed in concentrations ranging from 0.1–1.0 percent by weight and preferably in an amount within the range of 0.25–0.5 percent by weight.

The glycerol triacetate, when employed, operates to flexibilize the polyvinyl acetate film former. For this purpose, it is desirable, when glycerol triacetate is used, to combine the triacetate with the polyvinyl acetate emulsion and to continue agitation of the two components for a time sufficient to enable the triacetate to penetrate the resin particles. Usually two hours of agitation together is sufficient. When employed, the glycerol triacetate can be employed in amounts ranging from 1–3 percent by weight of a treating composition containing in proportion from 5–10 percent by weight of polyvinylacetate. Instead of glycerol triacetate, use can be made of other triacetate esters of polyhydric alcohols in corresponding amounts.

The following are representative of formulations embodying the features of this invention for treating continuous or staple glass fibers in sliver, roving and yarn formation:

*Example 1*

4.0–12.0 percent by weight polyvinyl acetate
0.4–2.0 percent by weight unsaturated organo-silicon compound
0.5–2.0 percent by weight dextrinized starch
0.25–0.5 percent by weight cationic softener
Remainder tap water

*Example 2*

8.0 percent by weight polyvinyl acetate (Swift & Company "1482–2")
0.5 percent by weight vinyl tris beta methoxy ethoxy silane (Linde X172)
1.0 percent by weight dextrinized starch (Globe Gum 163)
0.14 percent by weight cationic softener (Arnold-Hoffman RL–185A)

*Example 3*

5.0 percent by weight polyvinyl acetate (Quaker Oil Company R–HS)
0.5 percent by weight dextrinized starch
0.3 percent by weight vinyl trichloro silane
2.0 percent by weight acetone
0.46 percent by weight polyethylene glycol (Carbowax 4000)
Remainder water

*Example 4*

5.0 percent by weight polyvinyl acetate
0.5 percent by weight dextrinized starch
0.3 percent by weight vinyl trichloro silane
2.0 percent by weight acetone
0.75 percent by weight polyethylene glycol (Carbowax 20,000)
0.26 percent by weight cationic softener (Arnold-Hoffman ANCO–220)
Remainder water

*Example 5*

5.5 percent by weight polyvinyl acetate (Colten "Vinac OC–28")
0.4 percent by weight dextrinized starch
0.5 percent by weight vinyl tris beta methoxy ethoxy silane
0.25 percent by weight cation softener (Arnold-Hoffman RL–185A)
Remainder water

*Example 6*

3.0 percent by weight polyvinyl acetate (Colten "Vinac OC 28")
1.5 percent by weight polyvinyl acetate (Colten "Vinac XX")
0.3 percent by weight dextrinized starch
0.65 percent by weight vinyl tris beta methoxy ethoxy silane
0.3 percent by weight cationic softener
Remainder water

*Example 7*

4.0–12.0 percent by weight polyvinyl acetate
0.5–2.0 percent by weight dextrinized starch
0.4–2.0 percent by weight unsaturated organo-silicon compound
0.5–2.0 percent by weight polyhydric alcohol polymer
0.1–1.0 percent by weight cationic amine softener
Remainder water

*Example 8*

5–10 percent by weight polyvinylacetate emulsion
1–3 percent by weight glycerol triacetate
1–2 percent by weight vinyl tri(beta methoxy) ethoxysilane
1–2 percent by weight glass fiber lubricant (Arnold-Hoffman RL–185A)
Remainder water

*Example 9*

4–12 percent by weight polyvinyl acetate
0.4–2.0 percent by weight vinyl trichlor silane
0.5–2.0 percent by weight dextrinized starch
Remainder water No particular technique is to be followed in formulation with the exception that, in Example 8, the glycerol triacetate should be mixed with the aqueous emulsion of polyvinylacetate for about 2 hours prior to combination with the other ingredients. Otherwise conventional techniques can be employed in combining the various ingredients of the formulations in preparing the treating compositions.

In the treatment of continuous glass fibers, the coating composition can be applied to the individual glass fibers in forming by roll applicator or other conventional means, as the fibers are gathered together into the strand or before. In treatment of staple glass fibers, the compositions can be applied onto the fibers in forming, as by any suitable coating or spray process. When applied in this manner, the composition would be introduced into the forming hood for collection in the desired amounts upon the glass fiber surfaces as they are rained down from above and collected to form a sliver on a rotating drum, as in the process described in the Tucker et al. Patent No. 2,264,345. It is preferred, however, that the fibers be wetted with the composition by application as in a flow coat process as the fibers are rained down from above and gathered onto the surfaces of a rotating drum to form a web which is gathered together into a sliver. The sliver can then be drawn over a tube fitted with a slot through which the composition is caused to flow to wet the sliver of fibers as it is drawn thereover. The sliver can then be drafted into a roving and two or more such rovings can be inter-twisted to form yarns and the like. For the specific steps of yarn formation from staple fibers and the application of treating compositions, reference can be made to the aforementioned issued patent. In either system, the applied coating is preferably allowed to air dry, as for a time ranging to 24 hours, but drying subsequent to yarn or strand formation may be accelerated by the use of elevated temperatures not to exceed 400° F.

With reference to the system described, it will be apparent that the composition departs materially from the accepted concepts in systems of the type described. For example, it has been the accepted practice in the use of glass fibers as a reinforcement for plastic materials to avoid the use of hydrophilic materials in the treating composition because such materials were believed to cause decrease in the wet-out properties of the fibers by the resinous material with resulting depreciation of the bonding relation between the glass fiber surfaces and the resinous material. In the combination described, the dextrinized starch represents a hydrophilic material which not only provides an additional film forming material to enhance the bonding relationship and the protection of the glass fibers but it apparently enters in combination with the other materials to provide improved characteristics of bonding and film forming without sacrificing wet strength or wet-out of the glass fiber-resin combination. In fact, the dextrinized starch component in our size composition appears to enhance the wet-out of the glass fibers and the anchorage capable of being developed with the strongly hydrophilic surface characteristics of the glass fibers.

While dextrinized starch is preferred, many other of the described concepts are capable of development though of a lesser degree when other hydrophilic colloids are employed, such as polyvinyl alcohol, polyvinyl methyl ether, ethylene oxide condensates, and the like.

By way of still further modification, use can be made of an emulsifying agent in the treating composition as represented by allylalkyl polyether alcohol condensates as represented by "Triton X-100" of Rohm & Haas Company, dioctyl esters of sodium sulfosuccinate, sodium lauryl sulphate, and the like emulsifying agents. When employed, such emulsifying agents may be formulated into the composition in concentrations ranging from 0.1-1.0 percent by weight of the treating composition.

When applied to the glass fiber surfaces, compositions representing the practice of this invention cling to the glass fiber surfaces and provide a bonding relationship that holds the glass fiber surfaces together into the sliver and strand while permitting relative movement between the fibers but with such amounts of drag in yarn formation as will militate against non-uniformity between movements so that no one portion of the sliver will thin out more than others. This is essential in yarn formation of staple glass fibers, otherwise yarns of non-uniform fiber concentrations will be secured thereby to yield an unsatisfactory product. In addition to providing the desired balance between lubricity and bonding, the composition present on the glass fiber surfaces operates rapidly to wet out the fibers in a manner to provide protection from the film forming components in the treating composition to prevent deterioration of the glass fibers during processing. When set on the glass fiber surfaces subsequent to strand, yarn and textile formation, the coating present on the glass fiber surfaces is preferentially bonded to the glass fibers in a manner to resist separation by a moisture film which otherwise ordinarily would form between the coating and the glass fiber surfaces. Simultaneously, the film formed on the glass fiber surfaces is highly receptive to resinous materials so as to provide an enhanced bonding relationship as between the resinous materials and the glass fibers in the manufacture of reinforced plastics, laminates and coated fabrics. The bonding relationship appears to be enhanced with most of the resinous materials combined with the glass fibers in the glass systems but exceptional strengths are secured in the systems which make use of glass fibers in combination with resinous materials that are formed by addition polymerization through unsaturated or organic groups as represented by unsaturated polyesters.

Glass fibers sized with a composition of the type described also exhibits improved hand and feel which enables yarns, strands, textiles and other fabrics to be formed of the sized staple glass fibers having improved hand and feel and good draping characteristics.

It will be understood that changes may be made in the details of formulation and application as well as subsequent treatment without departing from the spirit of the invention, especially as defined in the following claims.

We claim:

1. In the manufacture of yarns and rovings of glass fibers which includes the steps of gathering a plurality of glass fibers together into an endless strand, applying a size composition to the fibers prior to strand formation, and forming a yarn of such strands of glass fibers, the improvement in which the size composition applied to the glass fibers comprises an aqueous system containing 4–12 percent by weight of polyvinyl acetate, 0.4–2.0 percent by weight of an unsaturated organo-silicon compound and 0.5–2.0 percent by weight of dextrinized starch, and which includes the step of drafting the sliver after the size composition has been applied but before drying of the size composition applied to the glass fiber surfaces.

2. In the manufacture of yarns and rovings of staple glass fibers which includes the steps of gathering the staple glass fibers into an endless sliver, applying a size composition to the staple fibers and drafting the sliver of sized fibers lengthwise to reduce the fiber density in cross section while increasing the orientation of the fibers to form a yarn, the improvement in which the size composition applied to the staple glass fibers prior to drafting comprises an aqueous system containing 4–12 percent by weight of polyvinyl acetate, 0.4–2.0 percent by weight of vinyl tris beta methoxy ethoxy silane and 0.5–2.0 percent by weight of dextrinized starch, and which includes the step of drafting the sliver prior to drying of the size composition applied to the staple glass fiber surfaces.

3. In the manufacture of yarns and rovings of staple glass fibers which includes the steps of gathering the staple glass fibers into an endless sliver, applying a size composition to the staple fibers and drafting the sliver of sized fibers lengthwise to reduce the fiber density in cross section while increasing the orientation of the fibers to form a yarn, the improvement in which the size composition applied to the staple glass fibers prior to drafting comprises an aqueous system containing 4–12 percent by weight of polyvinyl acetate, 0.4–2.0 percent by weight of vinyl trichloro silane and 0.5–2.0 percent by weight of dextrinized starch, and which includes the step of drafting the sliver prior to drying of the size composition applied to the staple glass fiber surfaces.

4. In the manufacture of yarns and rovings of glass fibers which includes the steps of gathering a plurality of glass fibers together into an endless strand, applying a size composition to the fibers prior to strand formation, and forming a yarn of such strands of glass fibers, the improvement in which the size composition applied to the glass fibers comprises an aqueous system containing 4–12 percent by weight of polyvinyl acetate, 0.4–2.0 percent by weight of an unsaturated organo-silicon compound, 0.5–2.0 percent by weight of a hydrophilic colloid and 0.5–2.0 percent by weight of a polyhydric alcohol polymer, and which includes the step of drafting the sliver after the size composition has been applied but before drying of the size composition applied to the glass fiber surfaces.

5. In the manufacture of yarns and rovings of glass fibers which includes the steps of gathering a plurality of glass fibers together into an endless strand, applying a size composition to the fibers prior to strand formation, and forming a yarn of such strands of glass fibers, the improvement in which the size composition applied to the glass fibers comprises an aqueous system containing 4–12 percent by weight of polyvinyl acetate, 0.4–2.0 percent by weight of an unsaturated organo-silicon compound, 0.5–2.0 percent by weight of dextrinized starch, 0.25–0.5 percent by weight of a cationic softener and 0.5–2.0 percent by weight of a polyhydric alcohol polymer, and which includes the step of drafting the sliver after the size composition has been applied but before drying of the size composition applied to the glass fiber surfaces.

References Cited in the file of this patent

UNITED STATES PATENTS

| | | |
|---|---|---|
| 2,245,824 | Roesch | June 17, 1941 |
| 2,390,370 | Hyde | Dec. 4, 1945 |
| 2,392,805 | Biefeld | Jan. 15, 1946 |
| 2,674,548 | Balz | Apr. 6, 1954 |
| 2,688,007 | Steinman | Aug. 31, 1954 |
| 2,712,509 | Biefeld | July 5, 1955 |
| 2,729,582 | Modigliani | Oct. 23, 1956 |
| 2,767,519 | Bjorksten | Oct. 23, 1956 |
| 2,780,909 | Biefeld et al. | Feb. 12, 1957 |
| 2,798,020 | Balz et al. | July 2, 1957 |
| 2,799,598 | Biefeld et al. | July 16, 1957 |